US005879792A

United States Patent [19]

Watanabe et al.

[11] Patent Number: 5,879,792

[45] Date of Patent: Mar. 9, 1999

[54] STENCIL PRINTING SHEET AND PROCESS FOR STENCIL MAKING THE SAME

[75] Inventors: Hideo Watanabe; Sadanao Okuda, both of Tokyo, Japan

[73] Assignee: Riso Kagaku Corporation, Tokyo, Japan

[21] Appl. No.: 783,822

[22] Filed: Jan. 13, 1997

Related U.S. Application Data

[63] Continuation-in-part of Ser. No. 395,831, Feb. 28, 1995, abandoned.

[30] Foreign Application Priority Data

Feb. 28, 1994 [JP] Japan .................................... 6-029785

[51] Int. Cl.[6] ............................ B32B 27/06; B05C 17/06

[52] U.S. Cl. .................................... 428/304.4; 428/306.6; 428/308.4; 428/311.31; 428/524; 428/530; 428/537.5; 428/308.8; 101/128.21; 425/811; 427/143

[58] Field of Search .............................. 428/304.4, 306.6, 428/308.4, 308.8, 311.11, 311.31, 501, 506, 514, 524, 530, 537.5; 427/143; 425/811; 442/153, 155, 160; 101/128.21

[56] References Cited

U.S. PATENT DOCUMENTS

| | | | |
|---|---|---|---|
| 3,246,986 | 4/1966 | Borchers . | |
| 4,940,646 | 7/1990 | Pawlowski | 430/175 |
| 4,960,671 | 10/1990 | Dickinson | 430/175 |
| 5,122,442 | 6/1992 | Moskowitz et al. | 430/325 |
| 5,149,577 | 9/1992 | Chang et al. | 428/207 |

*Primary Examiner*—Marie Yamnitzky
*Attorney, Agent, or Firm*—Fay, Sharpe, Beall, Fagan, Minnich & McKee

[57] ABSTRACT

A stencil printing paper and a process for perforating and engraving the same having the advantages in that the production of the stencil printing paper is easy, the resulting production cost can be thereby reduced and there is no generation of any problem at a time of stencil-making. In a stencil printing paper constituted by laminating a solvent-soluble resin layer to a porous substrate, the present invention comprises a stencil printing paper containing an acetalized polyvinyl alcohol having an acetalization degree of 1–70 mol % and a process for perforating and engraving the stencil printing paper by a mixed solvent containing water and an alcohol type solvent.

2 Claims, 2 Drawing Sheets

STENCIL PRINTING SHEET AND PROCESS FOR STENCIL MAKING THE SAME

This is a continuation-in-part of application Ser. No. 08/395,831 filed on Feb. 28, 1995, now abandoned.

BACKGROUND OF THE INVENTION

1. Field of the Invention

The present invention relates to a stencil printing sheet and a method for stencil-making the same. Specifically, it relates to a stencil printing sheet having a solvent-soluble resin layer and its stencil-making method.

2. Description of the Prior Art

As a stencil printing sheet, a heat-sensitive stencil sheet has conventionally been known which is obtained by superposing a thermoplastic resin film on a porous substrate and adhering to each other. As for methods for preparing heat-sensitive stencil sheet, there have been known the following methods, for example, (1) a method for stencil-making by using a heat-generating device of a flush lamp, infrared lamp or others, superposing a hand-written manuscript or preliminary prepared manuscript on a heat-sensitive sheet, and melting and perforating a thermoplastic resin film by the generated heat from the device described above, (2) a method for stencil-making by using a thermal head for generating a letter image information converted into an electric signal as a dotting heat, bringing a heat-sensitive stencil sheet in contact with the thermal head, and melting and perforating the thermoplastic resin. However, since the methods for stencil-making described above require a series of complicated processes for bringing a light-absorbed and heat-generated manuscript or thermal head in contact with a heat-sensitive stencil sheet, conveying the heat to the thermoplastic resin film in the heat-sensitive stencil sheet to melt the thermoplastic resin film, and subsequently contracting the melted material so as to perforate the thermoplastic resin film, there were some problems, for example, (1) a perforation failure is produced due to the bad contact between a thermoplastic resin film and a manuscript or thermal head for absorbing the heat; (2) adhesion failure is produced due to the nonuniformity in contact pressure of the thermal head, or shrinkage is produced in the heat-sensitive stencil sheet; (3) transfer failure of the heat-sensitive stencil sheet is produced by the melted material of the thermoplastic resin being adhered to the thermal head; (4) printing failure is produced since the melted material is left in the perforated portion and the passage of the ink is prevented; and others.

In recent years, a further improvement in quality of heat-sensitive stencil sheet is demanded. It is demanded to provide such a heat-sensitive stencil sheet that satisfies the smoothness of a thermoplastic resin film, the separating property of the thermoplastic resin film from the manuscript or thermal head, the melting property and the shrinkability of a thermoplastic resin film due to heat, the adhesive strength between a thermoplastic resin film and a porous substrate, and the mechanical strength and abrasion of the porous substrate, and therefore, the condition for producing heat-sensitive stencil sheet becomes complicated and there was the problem that the production cost was accordingly increased.

SUMMARY OF THE INVENTION

It is, accordingly, an object of the present invention to solve the above-mentioned problems in the prior art and provide such a heat-sensitive stencil sheet and a sheet-making method thereof as to be thereby produced easily and in a low cost, and generate no problems at a time of stencil-making as well.

The inventions to be claimed mainly for patent in the present application will be as follows:

(1) A stencil printing sheet which comprises a porous substrate and a solvent-soluble resin film laminated thereon wherein the solvent-soluble resin film contains an acetalized polyvinyl alcohol at an acetalization degree of 1–70 mol %.

(2) A process for stencil-making of a stencil printing sheet consisting of a porous substrate and a solvent-soluble resin film laminated thereon, which comprises perforating the stencil printing sheet by dissolving the solvent-soluble resin film with a mixed solvent of water and an alcohol type solvent.

The solvent-soluble resin film in the present invention contains an acetalized polyvinyl alcohol at an acetalization degree of 1–70 mol %, preferably 3–50 mol %, as a main component. If the degree of acetalization in polyvinyl alcohol is less than 1 mol %, the stencil printing sheet is inferior in its water resisting property, and if it exceeds 70 mol %, the stencil printing sheet is reduced in oil resistance. Since it contains such an acetalized polyvinyl alcohol as a main component, ink resisting property of the stencil printing sheet to water-soluble ink, oily ink, emulsion ink and other is improved.

As an acetalized polyvinyl alcohol, formal resins, butyral polymers and the like represented by the following general formula (1) may be preferably used.

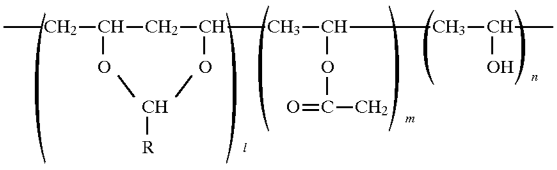

In the formula, R represents a hydrogen atom or alkyl group, 1 is defined in the range of 1–70 mol %, m is defined preferably in the range of 1–10 mol %, and n is defined preferably in the range of 1–90 mol %, respectively. The ratios of l, m and n are appropriately chosen depending upon the flexibility of the resin film, its compatibilities to other resins, its solubilities into other solvents, and so forth.

Acetalized polyvinyl alcohol used in the present invention can be prepared by reacting an aqueous solution of polyvinyl alcohol with butylaldehyde and acetaldehyde so as to give the above defined molar ratio 1, m and n of the three units in the presence of an appropriate catalyst, such as an acetic acid, a combination of sodium acetate and cation—exchange resin, and the like.

The solvent-soluble resin film can contain besides the acetalized polyvinyl alcohol described above, a thermoplastic resin or thermosetting resin soluble in a solvent, such as water or an organic solvent as well, so long as the water resisting property and oil resistance thereof at a time of printing are not prevented.

As for an organic solvent-soluble resin, there is exemplified polyethylene, polypropylene, polyisobutylene, polystyrene, polyvinyl chloride, polyvinylidene chloride, polyvinyl fluoride, polyvinyl acetate, acryl resin, polyacrylonitrile, polyamide, polyimide, petroleum resin, phenolic resin, amino resin, epoxy resin, polyester, polycarbonate, polyurethane, polysulfone, silicone resin, alkyd resin, melamine resin or the like. These resins may be used independently, in a form of an admixture of a plurality of resins or in a form of a copolymer of their monomers as well.

As for a water-soluble resin, a resin soluble in water or in a water-miscible solvent, there is exemplified methyl cellulose, carboxymethyl cellulose, hydroxyethyl cellulose, polyvinyl pyrolidene, polyethylene-polyvinyl alcohol copolymer, polyethylene oxide, polyvinyl ether, polyacrylamide, starch, dextrin, alginic acid, ascorbic acid, water-base urethane or the like. These resins may be used independently, in an admixture of a plurality of resins, or in a form of a copolymer of their monomers as well.

Furthermore, dyestuffs, pigments, fillers, binders and curing agents can be contained in the solvent-soluble resin film in addition to the resin components described above.

The thickness of the solvent-soluble resin film is usually in the range of 0.1–100 μm, and preferably, in the range of 1–50 μm, from the standpoints of strength of the resin film and perforation ability thereof depending upon a solvent.

As a porous substrate used in the present invention, there is exemplified Japanese paper and fibers cloth using natural fibers such as Manila hemp, pulp, Mitsumata (Edgeworthia papyrifara Sieb.), Kozo (Broussonetia Kazinoki Sieb.), synthetic fibers, such as that of polyester, nylon, vinylon, acetate fiber or the like, a thin leaf paper using metallic fiber, glass fiber, non-woven cloth or the like. These porous substrates can be independent or in the combination of two or more kinds thereof. Each basis weight of these porous substrates is usually, in the range of 1–20 $g/m^2$ and preferably, in the range of 5–15 $g/m^2$, from the standpoints of the strength of the paper and the permeability of the ink. Also, the thickness of the porous substrate is usually, in the range of 5–100 gm, and preferably, in the range of 10–50 μm, from the standpoints of the strength of the paper and the permeability of the ink.

The stencil printing sheet of the present invention is comprised by laminating a solvent-soluble resin film on a porous substrate.

The stencil printing sheet of the present invention can be produced by e.g., a process (1) for laminating a solvent-soluble resin film to a porous substrate with an adhesive or sticking agent, a process (2) for applying a heat-adhesion to a resin film and a porous substrate, a process (3) for coating a resin solution dissolved or dispersed into a solvent on a porous substrate and then drying the same, a process (4) for coating a solvent or dispersed resin solution on a separating substrate and drying to form a resin film, superposing a porous substrate on the formed resin film and pealing off the separating substrate, and other processes. Organic solvents, in addition to water or alcohol type solvent, can be used and properly chosen depending upon the drying property, working property, coating property and others when the stencil printing sheet is produced.

Since a stencil printing sheet of the present invention has a solvent-soluble resin film, once the resin film is brought in contact with a solvent which dissolves the resin film, the resin film in the contacted portion starts dissolving into the solvent and then, the resin film dissolves in the solvent up to its saturation in solubility. The solution which dissolved the resin film permeates into the interior of the porous substrate and the resin film corresponding to this portion is perforated. Since the solution which dissolved the resin film permeates into the porous substrate, the dissolved component is not left in the perforated portion of the resin film and does not obstruct the perforation. Furthermore, the perforating property of the resin film can be adjusted by controlling the solubility of the solvent to the resin film and the quantity of the contacting solvent.

As a solvent which dissolves the solvent-soluble resin film on the stencil printing sheet of the present invention, a mixed solvent containing water and an alcohol type solvent is used as a main component. As a solvent such alcohol type, monohydric alcohol, polyhydric alcohol, aliphatic saturated or unsaturated alcohol, alicyclic alcohol, aromatic alcohol, heterocyclic alcohol or the like are used. As a specific example, there is exemplified methyl alcohol, ethyl alcohol, isopropyl alcohol, n-propyl alcohol, butyl alcohol, isoamyl alcohol, hexyl alcohol, octyl alcohol, decyl alcohol, stearyl alcohol, allyl alcohol, cyclohexanol, benzyl alcohol, furfuryl alcohol, ethylene glycol, diethylene glycol, propylene glycol, 1,4-butanediol, 1,5-pentadiol, ethylene chlorohydrin, carbitol, glycerine, hydrobenzoin, benzpinacol, cyclopentane-1,2-diol or the like.

Also, the above-mentioned mixed solvent with water may also contain other organic solvents, such as those of aliphatic hydrocarbon type, aromatic hydrocarbon type, ketone type, ester type, ether type, aldehyde type, carboxylic acid type, fatty ester type, amine type, low molecular heterocyclic compounds, oxide type and the like. Specifically, hexane, heptane, octane, benzene, toluene, xylene, acetone, methyl ethyl ketone, ethyl acetate, propyl acetate, ethyl ether, tetrahydrofuran, 1,4-dioxane, formic acid, acetic acid, propionic acid, formaldehyde, acetaldehyde, methylamine, ethylenediamine, dimethylformamide, pyridine, ethylene oxides and others are exemplified.

Also, these solvents may contain dyestuffs, pigments, fillers, binders, hardeners, antiseptics, swelling agents, surfactants, pH controllers and others, if necessary.

The stencil-making of the stencil sheet of the present invention may be carried out by bringing a means, such as a brush pen impregnated with a water base solvent, in contact with a resin film directly soluble in the water base solvent, but it is preferable to stencil-make by supplying the water base solvent to the resin film in a non-contact condition by an ejecting device of the water base solvent so as to perforate it. As for a solvent ejecting means, there is exemplified such an apparatus that a nozzle, a slit, an injector, a porous material, a porous film or the like is connected to a liquid feed pump, a piezoelectric element or heating element so as to eject the solvent intermittently or continuously, in a dot or in a line form corresponding to each letter and picture image signal.

According to the present invention, it is possible to carry out the stencil-making of the stencil printing sheet in a non-contact condition with the resin film to a stencil-making apparatus, there is no generation of wrinkles at a time of stencil-making. Also, differently from a conventional heat-sensitive stencil sheet, no molten material is left on the perforated portion and a brilliant printed matter can be obtained. Furthermore, the stencil printing sheet of the invention can be produced without need of any separating property, abrasion and mechanical strength of the sheet as required in the conventional heat-sensitive stencil sheet.

The stencil printing sheet obtained by the process of the invention can be applied to a general stencil printing process to obtain a printed matter. For example, a printed matter can be obtained by mounting an ink on a perforated stencil printing sheet, passing the ink through each portion perforated by press rolls, reduced pressure means or squeegee rolls, and transcribing the ink to a printed paper.

Since the stencil printing sheet of the present invention is excellent in brilliant printed matters, water resisting property and oil resistance can be obtained even with use of any type of ink, such an oily ink usually used in stencil printing, water-base ink, water-in-oil emulsion ink, oil-in-water emulsion ink, and others.

DETAILED DESCRIPTION OF THE PREFERRED EMBODIMENTS

Figure 1:
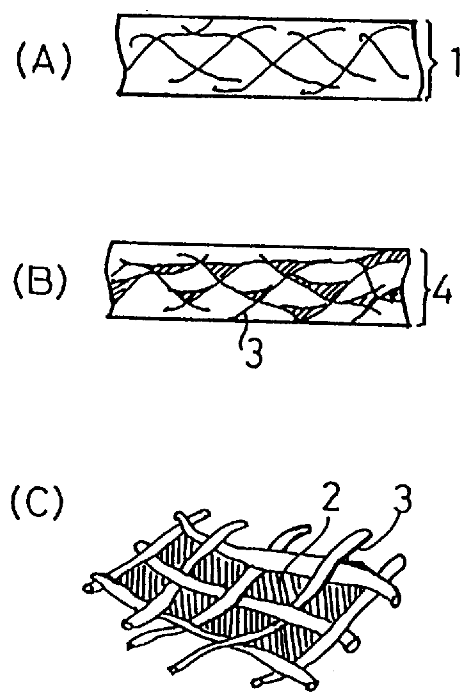
FIG. 1(A), FIG. 1(B) and FIG. 1(C) are sectional model views showing a stencil printing sheet as a preferred embodiment of the invention.

The invention will be described specifically with reference to examples in the following. It should be understood, however, that these examples do not limit the scope of the present invention.

In these figures, reference characters 1 to 19 means the following:

1. polyester fiber cloth
2. solvent-soluble resin film;
3. polyester fiber;
4. stencil printing sheet;
5. ejecting solvent;
6. contacting solvent;
7. resin solution for dissolving resin film and adhering to polyester fiber;
8. perforated portion in resin film;
9. and 10. ejection means
11. solvent-soluble resin film;
12. polyester sheet
13. Japanese paper
14. adhesive or sticking agent immersed in Japanese paper;
15. stencil printing sheet;
16. ejecting solvent;
17. contacting solvent;
18. resin solution permeated into Japanese paper;
19. perforated resin film.

EXAMPLE 1

A polyester fiber cloth having a sieve opening at 280 mesh was immersed in a resin solution consisting of the following resin composition, picked up from it and dried off. Then, a resin film of 3 $\mu$m in thickness was provided in the gap of the mesh to give a stencil sheet.

| | |
|---|---|
| Butyral resin (Polyvinyl alcohol having a butyralization degree of 40 mol %) | 10 parts by weight |
| Methyl ethyl ketone | 50 parts by weight |
| Toluene | 20 parts by weight |
| 1,4-dioxane | 20 parts by weight |

An aqueous solution consisting of the following composition was ejected in a letter shape to the stencil printing sheet described above from an ejecting means provided with a nozzle of 8 dots/mm and a piezoelectric element connected thereto, and the polyvinyl alcohol film at the ejected portion was dissolved and perforated.

| | |
|---|---|
| Ethyl alcohol | 50 parts by weight |
| Ethylene glycol | 10 parts by weight |
| Ethyl acetate | 10 parts by weight |
| water | 30 parts by weight |

Subsequently, a black ink (HI-MESH, trademark of Riso Kagaku Corporation) for use in a portable stencil printing device, PRINT GOKKO (trademark of RISO Kagaku Corporation) was mounted on the side of the polyester fiber cloth of the engraved stencil printing sheet, and the other side was superposed on a printing sheet to carry out printing by squeeging the ink by a blade resulting in printing brilliantly the similar letters to those of the perforated portions.

FIG. 1 shows a sectional model view of a stencil printing sheet obtained in Example 1, in which (A) shows a sectional model view of a polyester fiber cloth 1, (B) shows a sectional model view of a stencil printing sheet 4 forming a solvent-soluble resin film 2 on polyester fiber 3, and (C) shows a perspective view illustrating a stencil printing sheet 4 in a model form, respectively.

Figure 2:
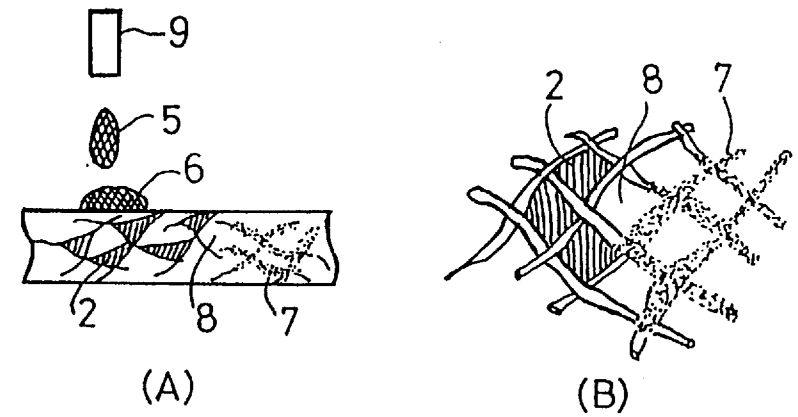
FIG. 2(A) and FIG. 2(B) are explanatory views showing a perforation of the stencil printing sheet of FIG. 1.

FIG. 2 is an explanatory view showing a perforation of a stencil printing sheet. (A) of FIG. 2 is a model view showing stencil-making and once solvents 5 and 6 are ejected from a solvent ejection means 9 and the ejected solvent is brought into contact with the surface of the stencil printing sheet 4, the solvent-soluble resin film at the contacted portion is dissolved and perforated. In the drawing, 7 represents a resin solution which dissolved the resin film and adhered to the polyester fiber cloth, and 8 represents a perforated portion of the resin film, respectively. (B) of FIG. 2 is a perspective view showing a perforated stencil printing sheet in a model form.

EXAMPLE 2

A resin solution consisting of the following composition was coated by a roll coater on a separating paper treated with silicone and dried off to obtain a solvent-soluble resin film of 3 $\mu$m in thickness thereon.

| | |
|---|---|
| Formal resin (Polyvinyl alcohol having a formalization degree Of 20 mol %) | 10 parts by weight |
| Methyl ethyl ketone | 30 parts by weight |
| Isopropyl alcohol | 50 parts by weight |
| 1,4-dioxane | 10 parts by weight |

Then, an adhesive solution consisting of the following composition was coated on a Japanese paper having a basis weight of 12 g/m$^2$ and dried off. Subsequently, the thus obtained solvent-soluble resin film on the separating paper was superposed on the adhesive layer on the Japanese paper and the separating paper was peeled off to give a stencil printing sheet.

| | |
|---|---|
| Ethylene-vinyl acetate copolymer | 20 parts by weight |
| Toluene | 80 parts by weight |

A mixed solvent having the following composition was ejected in a letter shape on the surface of the resin film of this stencil printing sheet from the similar means as shown in Example 1 and the resin film in the ejected portions was dissolved to perforate the stencil printing sheet, resulting in stencil-making.

| | |
|---|---|
| Isopropyl alcohol | 30 parts by weight |
| Glycerine | 10 parts by weight |
| Water | 60 parts by weight |

While a printing paper was superposed on the Japanese paper of the stencil sheet and a black oily ink was mounted on the other surface of the stencil sheet, the ink was squeegee by a blade. Brilliant letters in the same shape as the perforated portion were printed in the printing paper by means of PRINT GOKKO PG-10 (trademark of Riso Kagaku Corporation).

EXAMPLE 3

A resin solution consisting of the following composition was coated by a roll coater on a polyester sheet of 30 μm in thickness and dried off to obtain a solvent soluble resin film of 2 μm in thickness thereon.

| | |
|---|---|
| Formal resin (Polyvinyl alcohol having a formalization degree Of 10 mol %) | 10 parts by weight |
| Tetrahydrofuran | 20 parts by weight |
| Isopropyl alcohol | 30 parts by weight |
| Water | 40 parts by weight |

Then, an adhesive solution consisting of the following composition was coated with the similar adhesive solution to that of Example 2 on a Japanese paper having a basis weight of 12 $g/m^2$ and dried off. Subsequently, the thus obtained solvent-soluble resin film on the polyester sheet was superposed on the adhesive layer on the Japanese paper and the polyester sheet was peeled off to give a stencil printing sheet.

Then, by replacing the ink in the ink jet printer with a mixed solvent having the following composition, the solvent was ejected to the stencil printing sheet described above from the nozzle of this ink jet printer while making it correspond to the letters and images prepared by a personal computer and transmitted them to the solvent-soluble resin film, resulting in stencil-making by perforating the stencil sheet.

| | |
|---|---|
| Isopropyl alcohol | 30 parts by weight |
| Diethylene glycol | 10 parts by weight |
| Water | 60 parts by weight |

When the thus engraved stencil printing paper is printed in a manner similar to that of Example 2, good printed matters were obtained of the stencil paper.

Figure 3:
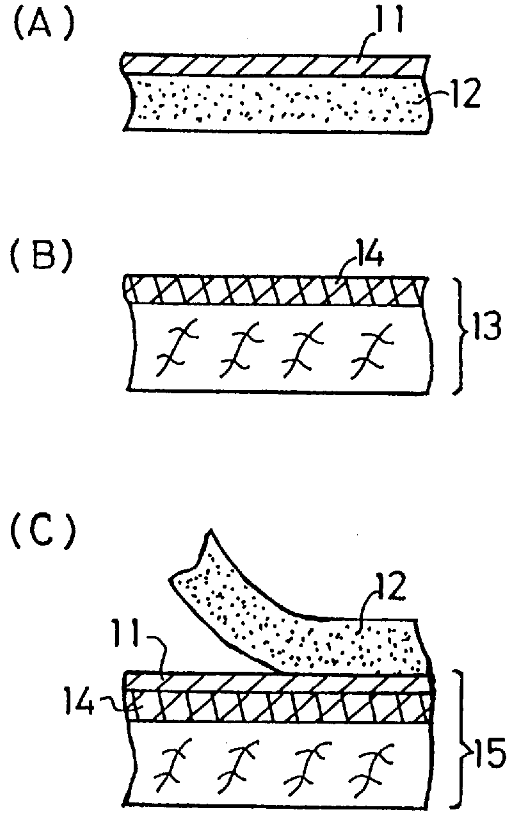
FIG. 3(A), FIG. 3(B) and FIG. 3(C) are diagrams showing a production process of a stencil printing sheet as an alternative preferred embodiment of the invention.

FIG. 3 shows a view of a production process for a stencil printing paper in Example 3. In FIG. 3(A), a solvent-soluble resin film 11 is formed on a polyester sheet 12 and in FIG. 3(B), an adhesive or sticking agent layer 14 is formed on a Japanese paper 13. In FIG. 3(C), the solvent-soluble resin film 11 and the adhesive or sticking agent are superposed on each other and the polyester sheet 12 on the solvent-soluble resin film 11 is peeled off to give a stencil printing sheet 15.

Figure 4:
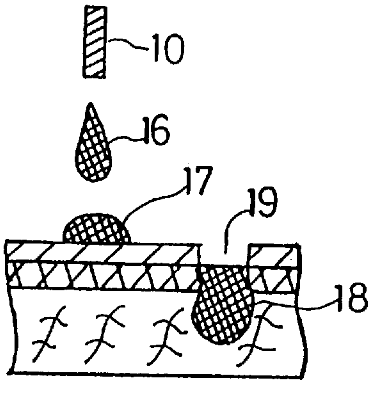
FIG. 4 is an explanatory view showing a perforation of the stencil printing sheet of FIG. 3.

FIG. 4 is an explanatory view showing a perforation of a stencil printing sheet. In the drawing, a solvent 16 is ejected from a solvent ejection means 10 and the ejected solvent is brought in contact with the surface of the stencil printing sheet. The contacting solvent 17 dissolves the resin film at the contacted portion. The dissolved solution 18 permeates into the interior of the Japanese paper and the contacted portion is perforated, resulting in giving a perforated resin film 19.

EXAMPLE 4

A resin solution consisting of the following composition was coated by a roll coater on a polyethylene film treated with silicone and dried off to obtain a solvent-soluble resin film of 30 μm in thickness thereon.

| | |
|---|---|
| Formal resin (Polyvinyl alcohol having a formalization degree Of 10 mol %) | 10 parts by weight |
| Acetone | 10 parts by weight |
| Ethyl alcohol | 50 parts by weight |
| Water | 30 parts by weight |

Then, a polyester fiber cloth having an opening sieve of 200 mesh was immersed in an adhesive solution consisting of the following composition, picked up therefrom and dried off. This and the above-mentioned soluble resin film were superimposed on each other and left in a thermo-statt at 40° C. overnight.

| | |
|---|---|
| Acryl resin | 20 parts by weight |
| Isocyanate | 5 parts by weight |
| Toluene | 45 parts by weight |
| Ethyl acetate | 30 parts by weight |

Then, the polyester film was peeled off from the resin film to give a stencil printing sheet. Subsequently, a water-base ink was ejected onto the solvent soluble film of the above-mentioned stencil printing sheet by a commercially available word processor of an ink jet type, and transited to the solvent-soluble resin film to perforate it. The thus engaged stencil printing sheet was set to the printing drum of a commercial stencil printing machine, RISOGRAPH RC115, (trademark of RISO KAGAKU CORPORATION) and the printing was carried out to give the similar brilliant letters and images to those recorded by the ink jet word processor used in stencil making.

Preparation Example of Acetalized Polyvinyl Alcohol of the Present Invention

Polyvinyl alcohol (200 g) having a polymerization degree of 2000, a saponification value of 88% by mole, and residual sodium acetate concentration of 1.0% by weight was added to water (1600 g), followed by stirring at 90° C. for about two hours to obtain an aqueous solution thereof. Then the resulting polyvinyl alcohol aqueous solution was cooled down to 45° C., and passed through a column filled with cation-exchange resin (Diaion SKIB, trade name of Misubishi kasei k.k.) (50 ml) at a space velocity (SV) of 10, to obtain a polyvinyl alcohol aqueous solution having a pH of about 3.5. The thus obtained polyvinyl alcohol solution was cooled down to 35° C., and reacted with butylaldehyde (20 g) at 35° C. for 8 hours to obtain a reaction product having a creamy color. The obtained reaction mixture was cooled down to 20° C. and added an aqueous ammonia (17 g) having a concentration of 5% by weight, to obtain a transparent solution. The resulting transparent solution was flowed down on a polyethylene film, and dried, to obtain a transparent film. This film consists of an acetalized alcohol having values of 1=10% by mole, m=10% by mole and n=80% by mole in the above units.

Comparative 1

A stencil printing sheet was prepared and a stencil-making was carried out thereon by following the similar procedure to that in Example 1 except that the solvent-soluble resin film in Example 1 was altered to the following resin composition.

| | |
|---|---|
| Butyral resin (Polyvinyl alcohol having a butyralization degree Of 80 mol %) | 10 parts by weight |
| Methyl ethyl ketone | 50 parts by weight |
| Toluene | 40 parts by weight |

This engraved stencil printing sheet was printed in the similar manner to that of Example 1. However, the resin film of other areas than the perforated portion started dissolving by the oily component of the ink, resulting in giving unclear printed matters.

Comparative 2

A stencil printing paper was prepared and a stencil-making was carried out thereon by following the similar procedure to that in Example 4 except altering the solvent-soluble resin film in Example 4 to the following resin film in Example 4 to the following resin composition.

| | |
|---|---|
| Polyvinyl alcohol | 10 parts by weight |
| Ethyl alcohol | 50 parts by weight |
| Water | 30 parts by weight |

This engraved stencil printing sheet was printed in the similar manner to that of Example 4. However, the resin film of other areas than the perforate portion started dissolving by the water component of the ink, resulting in giving unclear printed matters.

According to the stencil printing sheet of the present invention, since the stencil printing sheet of the present invention can be perforated by a solvent in its non-contact condition, there is no generation of any wrinkles and the like. Since no residues are left in the perforated portion, brilliant pictures can be obtained. Furthermore, since there is no need of considering the separability, antifriction, mechanical characteristics and the like to the thermal head was the case in the prior art, the resulting production becomes easy and the production cost can be reduced as well. Moreover, the solvent-soluble resin layer has water-resisting property and oil resistance, resulting in providing brilliantly printed matters by an oily ink, water-base ink, emulsion ink or the like.

In addition, since a mixed solvent of water and alcohol type solvent is used when the stencil-making is carried out according to the process of the present invention, the resulting environmental safety is improved thereby.

What we claim is:

1. A stencil printing sheet which comprises a porous substrate and a solvent-soluble resin film laminated thereon, wherein said solvent-soluble resin film contains an acetalized polyvinyl alcohol which has the following units:

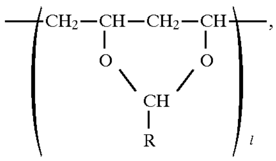

,

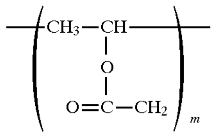

and

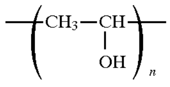

wherein R represents a hydrogen atom or alkyl group, l is defined in the range of 1–70 mol %, m is defined in the range of 1–10 mol %, n is defined in the range of 1–90 mol %, 1 +m+n=100 mol %, and all three units are bonded randomly.

2. A stencil printing sheet according to claim 1, wherein said acetalized polyvinyl alcohol has an acetalization degree of 3–50 mol %.

* * * * *